United States Patent [19]

Okai et al.

[11] Patent Number: 5,037,478

[45] Date of Patent: * Aug. 6, 1991

[54] CORROSION PREVENTIVE PIGMENT COMPRISING A PHOSPHATE SOURCE, A VANADIUM ION SOURCE, AND OPTIONALLY, A NETWORK MODIFIER AND/OR A GLASSY MATERIAL

[75] Inventors: Toshihiro Okai, Katano; Yoshiaki Okumura, Joyo; Mitsuyuki Oda, Kyoto; Takashi Yamamoto, Soraku; Masahiro Jinnouti, Nara, all of Japan

[73] Assignee: Nippon Paint Co., Ltd., Osaka, Japan

[ * ] Notice: The portion of the term of this patent subsequent to Dec. 5, 2006 has been disclaimed.

[21] Appl. No.: 376,029

[22] Filed: Jul. 6, 1989

Related U.S. Application Data

[63] Continuation of Ser. No. 90,965, Aug. 31, 1987, abandoned.

[30] Foreign Application Priority Data

| Feb. 18, 1987 | [JP] | Japan | 62-36189 |
| Feb. 18, 1987 | [JP] | Japan | 62-36190 |
| Feb. 18, 1987 | [JP] | Japan | 62-36191 |
| Feb. 18, 1987 | [JP] | Japan | 62-36192 |

[51] Int. Cl.$^5$ .......................... C09K 3/32; C09K 3/10; C09K 3/22
[52] U.S. Cl. .................................. 106/479; 106/14.5; 106/14.12; 106/14.23; 106/14.25; 106/14.34; 106/14.39; 106/14.44; 106/461; 106/462; 106/503; 106/443; 106/427; 252/389.54; 252/389.23; 423/DIG. 8; 423/62
[58] Field of Search ............... 106/479, 461, 462, 503, 106/427, 14.05, 14.12, 14.21, 14.23, 14.25, 14.34, 14.35, 14.39, 14.44, 443; 252/389.54, 389.23; 423/DIG. 8, 62

[56] References Cited

U.S. PATENT DOCUMENTS

| 1,947,122 | 2/1934 | Burdick et al. | 148/6 |
| 3,365,313 | 1/1968 | Roberts et al. | 106/14 |
| 4,017,315 | 4/1977 | Vukasovich | 106/14 |
| 4,105,511 | 6/1977 | Nikaido et al. | 204/38 |
| 4,505,748 | 3/1985 | Baxter | 106/14.39 |
| 4,576,649 | 3/1986 | Oliver et al. | 106/308 |
| 4,748,137 | 5/1988 | Nigrin | 501/46 |
| 4,785,088 | 11/1988 | Flohr et al. | 540/127 |
| 4,885,032 | 12/1989 | Okai et al. | 75/251 |

FOREIGN PATENT DOCUMENTS

| 716559 | 8/1965 | Canada . |
| 959778 | 3/1957 | Fed. Rep. of Germany . |
| 307637 | 8/1955 | Switzerland . |
| 308275 | 8/1955 | Switzerland . |

OTHER PUBLICATIONS

Bienstock, "Corrosion" 17, 511t–574t (1961) (Chem Abs. 56:5754e) Corrosion Inhibitors for hot Carbonate System.
Tomaszewski U.S. 3,268,307 Electrodeposition of a corrosion resistant nickel–chromium coating (abstract) C.A. 65:14845c.

*Primary Examiner*—William R. Dixon, Jr.
*Assistant Examiner*—Scott L. Hertzog
*Attorney, Agent, or Firm*—Wenderoth, Lind & Ponack

[57] ABSTRACT

Disclosed is a corrosion preventive pigment consisting essentially of (a) a phosphorus compound which generates phosphate ions in the presence of water and oxygen, selected from the group consisting of a phosphorous pentoxide, an orthophosphoric acid, a condensed phosphoric acid, and alkaline earth metal or transition metal phosphate, or an alkaline earth metal or transition metal condensed phosphate, and (b) a vanadium compound which generates a vanadate ion in the presence of water and oxygen, selected from the group consisting of vanadium (V) oxide, a vanadyl compound, an alkaline earth metal or transition metal vanadate, a baked condensate of alkaline earth metal or transition metal vanadates, or a heterocondensate of alkaline earth metal or transition metal vanadates;

and which has a pH value of from 5 to 9.

6 Claims, No Drawings

CORROSION PREVENTIVE PIGMENT COMPRISING A PHOSPHATE SOURCE, A VANADIUM ION SOURCE, AND OPTIONALLY, A NETWORK MODIFIER AND/OR A GLASSY MATERIAL

This application is a continuation of Ser. No. 07/090,965, filed Oct. 31, 1987, abandoned.

FIELD OF THE INVENTION

The present invention relates to a corrosion preventive pigment used for coating compositions, inks and the like.

BACKGROUND OF THE INVENTION

Metal corrodes in the presence of water, oxygen or electrolyte ions. It is believed that the corrosion of metal is caused by forming a local cell on a metal surface to promote an electrochemical reaction.

In order to prevent the corrosion of metal, it is generally necessary to form, on the metal surface, a stable very thin film, e.g. a passive film. A method in which a metal substrate is contacted with a chromate ion is typically proposed. The chromate ion has two functions. One is an oxidizer function whereby the chromate ion ($CrO_4^{2-}$) is reacted with a metal atom, such as Fe to form stable gamma-$Fe_2O_3$, and the other is a deposition function whereby the chromate ion is reduced to form a chromium oxide, for example $Cr_2O_3$ which is deposited on a metal surface. According to these two functions, a physical barrier film is formed on the metal surface to develop excellent corrosion preventive properties.

However, the chromium (VI) having high corrosion preventive properties is toxic to the human body and therefore its use is very limited in use by several regulations in Japan. Accordingly, many efforts have been expended to develop a corrosion preventive agent which has little or no toxicity human body. For example, phosphate materials, especially zinc phosphate, silicophosphate, aluminum condensed phosphate and the like have now been studied and some of these materials are commercially available. The phosphate materials, however, have only a deposition function whereby the phosphate materials are reacted with a metal to produce a material protecting the metal substrate, and do have not an oxidizer function. The phosphate materials have low corrosion preventive properties in comparison with the above mentioned chromate ions.

BRIEF EXPLANATION OF PRIOR ART

The present inventors have proposed that the oxidizer function which was lacking the phosphate materials can be compensated for by a soluble ion of vanadium (see Japanese Patent Application Ser. No. 204794/1986).

Japanese Patent Publication (unexamined) Nos. 115965/1986 and 161558/1986 disclose an inorganic paint containing a poly-silicophosphate and a vanadate. The poly-silicophosphate acts as a crosslinking agent for the water glass and not as corrosion preventive pigment.

SUMMARY OF THE INVENTION

The present invention relates to a corrosion preventive pigment comprising a phosphate ion source generating phosphate ions in the presence of water and a vanadate ion source generating vanadate ions when contacted with water and oxygen. The pigment comprises a phosphorus compound and a vanadium compound, or a pigment obtained by calcining a mixture of a phosphorus compound, a vanadium compound, and optionally a network modifier and a glassy material, followed by grinding, which pigment has a pH value of from 5 to 9.

DETAILED DESCRIPTION OF THE INVENTION

The pigment of the present invention can be prepared by two methods, one being a mixing method and the other being a calcining method.

The phosphorus compound (a) includes orthophosphoric acid; condensed phosphoric acid; an orthophosphate or condensed phosphates of metals, phosphorus pentoxide; phosphate minerals; composite phosphate pigments; and mixtures thereof. Orthophosphoric acid (orthophosphate) herein includes monohydrogen derivatives ($HPO_4^{2-}$) and dihydrogen derivatives ($H_2PO_4^-$). The condensed phosphates also include the hydrogen derivatives thereof. The condensed phosphates further include metaphosphoric acid (metaphosphate), polyphosphoric acid (polyphosphate) and polymetaphosphoric acid (polymetaphosphate). Examples of the phosphorus compounds are conventional composite phosphate pigments, such as poly silicophosphate and the like; a condensed phosphoric acid, such as pyrophosphoric acid, metaphosphoric acid; condensed phosphates, such as metaphosphate, tetrametaphosphate, hexametaphosphate, pyrophosphate, acidic pyrophosphate, tripolyphosphate and the like; and mixtures thereof. Metals forming a phosphate are limited, alkaline earth metals such as magnesium and calcium; transition elements such as manganese, cobalt, iron, nickel; and the like. Preferred metals are alkaline earth metals.

In addition to the above mentioned phosphoric acid and phosphates, a sludge formed from a zinc phosphate treatment of iron substrates, which mainly contains zinc iron phosphate, can be used for the present invention, if contaminants such as crude particles, electrolyte including a chloride ion are removed from it by means of sieving or rinsing and the like.

The vanadium compound (b) of the present invention can be oxides, hydroxides, oxyacid salts, halides, sulfate. The vanadium compound having a valency of 5 is preferred. The vanadium compound having a valency of 5 generates vanadate ions so that it is easy to form a heteropolymer by reacting with a phosphate ion. Examples of the vanadium compounds (b) are a vanadium (V) compound, such as vanadium (V) oxide ($V_2O_5$); a vanadate such as an orthovanadate of a metal, metavanadate, pyrovanadate, vanadyl halide ($VOX_3$) and the like; and mixtures thereof. The metals for the vanadates can be the same as listed in the phosphates. The vanadium compound (b) may be prepared by heating vanadium oxide with oxides, hydroxides, carbonates, etc of another metal at more than 600° C. As mentioned in discussing the phosphate compounds, alkali metals are not always good for the present invention because of solubility. However, the alkali metal can be used if the solubility is controlled. In this case, a matrix material, especially a glass material, is preferred.

The network modifier of the present invention is a metal ion source which is added for modifying a network structure. Examples of the metal ions for the network modifiers are alkaline earth metal ions and transition metal ions. Preferred are those listed in discussion of the phosphate compounds. The network modifier (c) is generally provided in the form of oxides, hydroxides, carbonates, nitrates, organic acid salts, silicates, borates, sulfates, chlorides and the like. Preferred are oxides, hydroxides and carbonates. If sulfates or chlorides are adopted, these compounds adversely affect the coating properties because of their high water-solubility. In such a case, the matrix material including the glassy material or the coating on the particles effectively prevents water-solubility.

In the network modifier, manganese oxide (MnOx: $1.5 < x \leq 2.0$) has a special function. Manganese oxide has an oxidating effect so as to prevent a reduction of the oxidation number of vanadium.

The glassy material (d) of the present invention includes not only a matrix-forming glass such as silicate glass and borate glass, but also glass containing a metal element, such as a metal element of the nework modifier, in a matrix-forming glass. Examples of the glassy materials are silica glass; silicate glass, such as sodalime-silicate glass ($Na_2O$—$CaO$—$SiO_2$ type), lead-silicate glass ($Na_2O$—$PbO$—$SiO_2$ type), aluminosilicate glass ($Al_2O_3$—$CaO$—$SiO_2$ type), borosilicate glass ($Na_2O$—$B_2O_3$—$SiO_2$ type); lead-borosilicate glass ($PbO$—$B_2O_3$ type, so called solder glass); aluminoborophosphate glass ($BaO$—$Al_2O_3$—$B_2O_3$ type); aluminophosphate glass ($P_2O_5$—$Al_2O_3$—$ZnO$ type); and the like. Preferred is sodalime glass (C glass), such as glass flakes (CCF-150; commercially available from Nippon Glass Fiber Co. Ltd.); aluminosilicate glass (E glass), such as glass flake (CEF-150; commercially available from Nippon Glass Fiber Co., Ltd.); and borosilicate glass, such as pyrex available from Coaning Glass Works Co. Ltd.). The electric conductivity of the glassy material is preferably not more than 500 $\mu S/cm$ when one gram of glassy material particles is dipersed or suspended in 100 ml of water. Amounts more than 500 $\mu S/cm$ deteriorate corrosion resistance.

The pigment of the present invention is prepared by melting a mixture of the phosphorus compound (a), the vanadium compound (b), optionally the network modifier (c) and the glassy material (d), and cooling and grinding. The other inorganic materials, such as the matrix, except for the glassy material, can be formulated in the mixture. Calcining is carried out at a temperature of more than the melting point ($T_1$) of the molten product of the mixture, for example, more than 600° C., more preferably more than 1,000° C., most preferably more than the higher melting point of either $T_1$ or the glassy material. Temperatures less than that mentioned above become insufficient for reaction. The amounts of the phosphorus compound (a) and the vanadium compound (b) is within the range of 0.3 to 100, preferably 1 to 10 in terms of the molar ratio of $P_2O_5/V_2O_5$. The amount of the network modifier (c) is 1.3 times to 3 times, preferably 1.5 to 2.0 times of the total molar number of $V_2O_5$ and $P_2O_5$ in case where all cations are expressed in the form of MO, $M_2O_3$, $M_3O_4$, or $MO_2$ according to their oxidation numbers. The form of the oxide is MO when the oxidation number is 2, $M_2O_3$ when the oxidation number is 3, $M_3O_4$ when the oxidation number is 2 and 3 (for example, Mn is liable to have an oxidation number of both 2 and 3 when melted) and $MO_2$ when the oxidation number is 4. In case where manganese oxides are added to the vanadium compound in order to avoid reducing the oxidation number of the vanadium element, the manganese oxides are used in an amount of not less than 0.1 mode based on one mole of $V_2O_5$. Amounts less than 0.1 mole are not sufficient to avoid reducing the oxidation number number of the vanadium element. When the manganese oxide is employed temperature is set within the range of 700° to 1400 C. Temperatures less than 700° C. do not produce oxygen from the manganese oxides, and temperatures more than 1400° C. can not avoid reducing the oxidation number of vanadium. The glassy material (d) is present in an amount of 5 to 500 times, preferably 10 to 100 times of the total amount of the phosphorus compound (a), the vanadium compound (b) and the network modifier (c). Amounts outside of the above mentioned range do not provide sufficient corrosion resistance. The term "corrosion" herein means not only nomal rust, but also blisters on the coatings. The period for heating is generally 0.2 to 10 hours, but periods greater than 10 hours have substantially no effect on the physical properties of the corrosion preventive pigment of the present invention. The components to be heated or melted are preferably particles having a particle size of not more than 100 $\mu m$, because heating or melting can be easily carried out. Accordingly, the components are ground prior to mixing, or can be mixed and then ground. Grinding can be carried out by wetting the components with water or with another solvent or in the form of a slurry.

The calcined product (hereinafter may called a "melt") is cooled and ground and classified into not more than 10 $\mu m$, preferably not more than 2 $\mu m$ by a method known to the art. Cooling can be carried out slowly or rapidly if the melt is divided into a plural phase.

In the case where a pigment having a light color is required for some purpose, the components (a-d) having a light color are selected or they are selected such that the obtained pigment has light color. For example, when the phosphorus compound has the following formula;

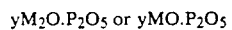

$$yM_2O.P_2O_5 \text{ or } yMO.P_2O_5$$

wherein $1 \leq y \leq 3$, M represents a metal element, preferably calcium or magnesium, and when the vanadium compound has the following formula;

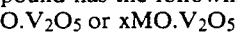

$$xM_2O.V_2O_5 \text{ or } xMO.V_2O_5$$

wherein $\frac{1}{2} \leq x \leq 3$, preferably $1 \leq x \leq 2$, a pigment having light color is obtainable if P/V is adopted to have a value of 5 to 30.

Although the corrosion preventive pigment can be obtained by calcining the pigment it may also be obtained by mixing the materials optionally under of pressure. Preferred examples of the phosphorus compounds (a), which are included in the above mentioned phosphorus compound (a), are an orthophosphate, a condensed phosphate, a heterocondensate of phosphoric acid such as a phosphomolybdate and the like. The phosphorus compound (a) preferably has a pH of 5 to 9 and an electric conductivity ($\kappa$) of 100 $\mu S/cm$ to 3 mS/cm, more preferably 100 $\mu S/cm$ to 2 mS/cm in an aqueous solution. The electric conductivity is determined by using a conventional conductometer and the pH value is determined by using a pH meter by dispersing or suspending 1 g of the phosphorus compound (a) of one gram in 100 ml of water. The phosphorus compound (a) has high corrosion preventive properties in this pH and conductivity range. The compound (a)

outside of this range can be employed by a suitable treatment. Another example of such a compound (a) is sludge in a phosphate conversion coating, such as that in zincphosphate coating and the like. This sludge in a phosphate conversion coating is a precipitate of phosphates produced in the chemical treatment of iron, steel, or zinc plated steel with a known zinc phosphate treating agent.

Preferred vanadium compounds (b) used for the mixing method are vanadyl compounds, vanadates, condensates of vanadates, heterocondensates of vanadates and the like. The vanadate ions in an aqueous solution can be changed to various forms due to the pH of the aqueous solution and the like. The vanadate ions mainly are condensed vanadate ions or hydrogen-containing ions thereof. The vanadate ions herein is understood to include such condensates. The vanadium compound (b) has preferably a pH of 5 to 9 and an electric conductivity of 30 $\mu$S/cm to 3 mS/cm, preferably 100 $\mu$S/cm to 2 $\mu$S/cm. In this range, it has excellent corrosion preventive properties. Other vanadium compounds (b) outside of said range can be used by preliminary treating these materials to produce vanadium compounds within said range.

In this embodiment, the pigment of the present invention is obtained by mixing the phosphorus compound (a) with the vanadium compound (b). Generally, a compound having a high solubility is formulated in a small amount, while a compound having a small solubility is formulated in a large amount. Excellent corrosion preventive properties are provided when the concentration of the phosphate ions is higher than that of vanadate ions. Accordingly, if the electric conductivity of the phosphorus compound is represented by $\kappa p$, the amount by $Cp$; the electric conductivity of the vanadium compound by $\kappa v$, and the amount of vanadium is $Cv$, the preferred combination is $\kappa p > \kappa v$ or $Cp > Cv$. The more preferred combination is $\kappa p > \kappa v$ and $Cp > Cv$. The most preferred combinations, when magnesium hydrogenphosphate and an n(metal oxide).($V_2O_5$) are employed, are $nMgO \cdot V_2O_5$ or $nCaO \cdot V_2O_5$ ($1.8 < n < 2.2$), $ZnO \cdot V_2O_5$ ($1 < n < 3.5$), $nCoO \cdot V_2O_5$ or $nCoO_3O_4 \cdot V_2O_5$ ($1 < n < 3.5$); when calcium hydrogenphosphate is employed, $nCaO \cdot V_2O_5$ ($2 < n < 2.2$), $nMn_3O_4 \cdot V_2O_5$, $nMn_2O_3 \cdot V_2O_5$ or $nMnO \cdot V_2O_5$ ($1 < n < 3.5$).

In another embodiment of the mixing method, a corrosion preventive pigment is prepared by mixing under pressure the phosphorus compound (a), the vanadium compound (b) and the network modifier (c). The obtained pigment is different from a mixture produced without being treating at a high temperature. In this embodiment, the preferred phosphorus compound (a) is calcium monohydrogen phosphate, calcium phosphate, magnesium monohydrogen phosphate or magnesium phosphate. The preferred vanadium compound (b) is vanadium oxide (V). Also, a suitable network modifier (c) is calcium oxide, calcium hydroxide, magnesium oxide or magnesium hydroxide. The pressure herein may be impact force, shearing force and the like. The pressure is imparted by a hummer mill, a mortar or a grind type mill. This type of reaction under pressure is called a mechanochemical reaction. The mechanochemical product can be further heated at a temperature of 100° to 300° C., preferably 150° to 250° C.

The corrosion preventive pigment of the present invention has a particle size of not more than 10 $\mu$m, preferably not more than 2 $\mu$m.

The pigment of the present invention may be treated to enhance the dispersing stability, if necessary. In the dispersing stability treatment, a dispersant may be absorbed on the surface of the pigment.

The pigment of the present invention can be formulated into a corrosion preventive wax, a paint, a lining and the like.

The paint can be any type known in the art. The paint may contain an extender, a color pigment, a vehicle, a solvent and another additive. Any type of vehicle can be used for the paint and the solvent is one which dissolves a vehicle resin. Examples of the vehicles are epoxy resins, tar modified epoxy resins, urethane modified epoxy resins, melamine resins, melamine alkyd resins, alkyd resins, oil modified alkyd resins, phenol resins, epoxy modified phenol resins, chlorinated resins, polyester resins, silicone resins, acryl resins, polyurethane resins, petroleum resins, polyethylene, polypropylene, fluorinated resins, oils and the like. Examples of solvents are hydrocarbons, ketones, esters, alcohols, water and the like. Examples of the additives for paints are plasticizers, surfactants, driers, crosslinking agents, dispersants, thickners, and antisagging agents.

The paint can be coated by a conventional method to dry or cure it. The cured coating preferably has an oxygen permeability coefficient (P) of $1 \times 10^{-16}$ to $1 \times 10^{-7}$ (ml(STP).cm/cm$^2$.s.cmHg), within which the coating has excellent corrosion resistance.

The pigment of the present invention is present in the paint in an amount of 0.1 to 50 parts by weight based on the solid contents of 100 parts by weight.

The metal substrate for the pigment of the present invention includes steel, high strength steel, high tensile steel, plated steel, stainless steel, iron, aluminum and the like.

The pigment of the present invention effectively prevents or inhibits corrosion which occurs in a condition wherein water and oxygen are present, or under conditions which accelerate the occurrence of blisters. Such a corrosive condition may contain ions which are believed to accelerate corrosion, such as a chloride ion. The pigment of the present invention effectively inhibits a decline of coatings. The pigment of the present invention effectively functions within a pH range of 5 to 9.

The pigment of the present invention has corrosion preventive properties equal or superior to chromate ions. The present invention provides a corrosion preventive pigment which does not pollute the environment. The corrosion to be inhibited by the pigment of the present invention includes weight loss by corrosion, corrosion cracking, hydrogen embrittlement, filiform corrosion, pitting corrosion, edge creep, and fabrication portion (bend portion) corrosion.

EXAMPLES

The present invention is illustrated by the following examples which, however, are not to be construed as limiting the invention to their details.

EXAMPLES 1 to 21 and COMPARATIVE EXAMPLES 1 and 2

A phosphorus compound (a) and a vanadium compound (b) were mixed by a mortar for 30 minutes in the amount shown in Table 1, and then calcined in a crucible within an electric furnace at a condition shown in Table 1. The calcined material in the crucible was cooled at a cooling rate of 100° C./minute. The cooling rate was calculated from the formula; (Furnace temperature—Temperature of the cooled material)/(Period of time for cooling). For controlling the cooling rate, a cool copper panel was pressed onto the molten material. The cooled calcined material was ground to powder having an average particle size of not more than 10 μm. A portion of the vanadium compound used in the process mentioned above was prepared by baking the components shown in Table 1 at 1,200° C.

The powder was dispersed in a 3% NaCl solution to form a 10 g/liter dispersion in which a bright steel panel (JIS 3141 G SPCC(SB)) was immersed for 30 days. Weight loss of the panel was determined and compared with strontium chromate of a same amount. In the evaluation, "good" shows superior to strontium chromate, "Normal" shows equal to it and "bad" shows inferior to it.

The present example also includes a test for blister inhibition. The test was conducted on the coating of the substrate under a temperature gradient condition and under electric corrosion preventive conditions.

Preparation of paint

The following ingredients were mixed by a sand mill to form a paint.

| Ingredients | Parts by weight |
| --- | --- |
| Coal tar pitch varnish | 30 |
| Polyol resin varnish | 12 |
| Extender | 20 |
| The corrosion preventive pigment of the present invention | 2 |
| Sag-resistance agent | 0.5 |
| Methyl isobutyl ketone | 5 |
| Xylole | 20.5 |
| A reaction product of toluidine diisocyanate and polyol (Colonate 55 from Nippon Polyurethane Co. Ltd.) | 10 |

The resultant paint was spray coated on a dull steel panel (JIS G 3141 SPCC SD) and dried for 10 days at ambient temperature to form a film having 200 μm. The coated panel was subjected to a blister test as follow:

Blister test under temperature gradience:

A temperature slope was set to 40° C. on the coat side and to 20° C. on the other side and the coated panel was immersed in a water for 14 days, after which blisters on the coating was visually evaluated.

Excellent—very good in comparison a comparative sample.
Good—superior to the comparative sample.
Normal—equal to the comparative sample.
Bad—inferior to the comparative sample.

The comparative sample was obtained from Comparative Example 1 in which any corrosion preventive pigment was not formulated, but an extender pigment was added.

Peeling property under electric anticorrosion

A zinc metal was connected to the coated panel and immersed in a 3% NaCl solution for one month at 30° C. Evaluation was made by a creepage (1/mm) from a scratch.

| Excellent | $0 < P \leq 2$ |
| --- | --- |
| Good | $2 < P \leq 5$ |
| Normal | $5 < P \leq 8$ |
| Bad | $8 < P \leq 12$ |
| Very bad | $12 < P$ |

The results are shown in Table 1.

TABLE 1

| | Phosphorus compound (a) | Vanadium compound (b) | Molar ratio $P_2O_5/V_2O_5$ | Calcining temperature (°C.) | Calcining time (h) | Cooling rate °C./min | pH | Weight loss of corrosion | Blister under temperature gradience | Creepage under electric anticorrosion |
| --- | --- | --- | --- | --- | --- | --- | --- | --- | --- | --- |
| Example | | | | | | | | | | |
| 1 | Orthophosphoric acid | $3CaO.V_2O_5$ melt | 5/1-3 | 600 | 1 | 100 | 2.9 | Bad | Good | Normal |
| 2 | Metaphophoric acid | $CaO.V_2O_5$ melt | 1/1-1 | 800 | 1 | 100 | 2.9 | Bad | Good | Normal |
| 3 | Pyrophosphoric acid | $MnO.V_2O_5$ melt | 1/1-1 | 800 | 1 | 100 | 2.9 | Bad | Good | Normal |
| 4 | Calcium phosphate | Vanadium oxide ($V_2O_5$) | 1/1-3 | 1100 | 2 | 300 | 4.8 | Normal | Excellent | Good |
| 5 | Magnesium monohydrogenphosphate | Vanadium oxide ($V_2O_5$) | 2/1-4 | 1100 | 2 | 300 | 6.0 | Good | Good | Good |
| 6 | Magnesium orthophosphate | $CaO.V_2O_5$ melt | 1/1-3 | 1400 | 2 | 500 | 6.1 | Good | Good | Excellent |
| 7 | Sludge in zinc phosphating | $3CaO.V_2O_5$ melt | 1/1-6 | 1400 | 2 | 600 | 6.9 | Good | Normal | Good |
| 8 | Calcium metaphosphate | $4CaO.V_2O_5$ melt | 1/1-5 | 1400 | 2 | 100 | 8.4 | Good | Bad | Normal |
| 9 | Aluminum tripoly-[1] phosphate type pigment | $ZnO.V_2O_5$ melt | 1/1 | 1400 | 3 | Slow* | 6.0 | Bad | Normal | Good |
| 10 | Composit phosphate pigment[2] | Vanadium oxide (V) ($V_2O_5$) | 10/1 | 1400 | 3 | Slow | 2.0 | Bad | Excellent | Excellent |
| 11 | Calcium metaphosphate | Vanadium oxide (III).($V_2O_3$) | 2/1-2 | 1100 | 3 | Slow | 3.2 | Bad | Excellent | Good |
| 12 | $P_2O_5$ | Vanadium oxide (IV) ($V_2O_4$) | 2/1-6 | 1100 | 3 | Slow | 2.1 | Bad | Good | Normal |
| 13 | Magnesium metaphosphate | $3CaO.V_2O_5$ melt | 20/1 | 1200 | 2 | Slow | 5.7 | Good | Good | Good |
| 14 | Calcium metaphosphate | $MgO.V_2O_5$ melt | 1/1-2 | 1200 | 1 | 200 | 4.5 | Good | Excellent | Good |
| 15 | $P_2O_5$ | $4MnO.V_2O_5$ melt | 1/1-4 | 1200 | 2 | 300 | 7.3 | Good | Bad | Good |
| 16 | Calcium | $CaO.V_2O_5$ melt | 50/1-51 | 110 | 2 | 300 | 3.5 | Bad | Excellent | Good |

TABLE 1-continued

| | Phosphorus compound (a) | Vanadium compound (b) | Molar ratio $P_2O_5/V_2O_5$ | Calcining temperature (°C.) | Calcining time (h) | Cooling rate °C./min | pH | Weight loss of corrosion | Blister under temperature gradience | Creepage under electric anti-corrosion |
|---|---|---|---|---|---|---|---|---|---|---|
| | metaphosphate | | | | | | | | | |
| 17 | Calcium phosphate | Vanadyl trichloride | 1/1-3 | 1200 | 2 | Slow | 5.8 | Good | Normal | Normal |
| 18 | Same as Example 60 | Same as Example 6 | 1/1-3 | 1200 | 2 | Slow | 6.2 | Good | Normal | Good |
| 19 | A mixture of $Zn(PO_4)_2$ and orthophosphoric acid | $2MgO.V_2O_5$ melt | 2/1 | 1300 | 2 | 100 | 5.1 | Normal | Good | Good |
| 20 | A mixture of $CaHPO_4$ and $P_2O_5$ (mol ratio 1:2) | A mixture of $V_2O_5$ and $V_2O_4$ (molar ratio 1:1) | 5/1-2 | 1200 | 2 | 100 | 2.5 | Bad | Good | Normal |
| Comparative Example | | | | | | | | | | |
| 1 | None | None | | | | | 6.5 | Bad | Normal | Normal |
| 2 | | Strontium chromate | | | | | 8.0 | Normal | Bad | Normal |

Examples 13 and 16 are light color pigments.
[1]Available from Teikoku Kako Co., Ltd. as K-White 82
[2]Available from Mizusawa Chemical Industries Co., Ltd. as MIZUKANEX 300.

EXAMPLE 21 to 27 and COMPARATIVE EXAMPLE 3

An amount of the pigment of Example 5 was changed and subjected to a salt spray test.

The corrosion preventive pigment of the present invention, an extender and a color pigment were formulated into a thermosetting epoxypolyurethane resin to form a paint of 100 parts by weight. The paint was coated on a dull steel panel in a thickness of 20 μm to cure at 190° C. for one minutes. The resultant coated panel was subjected to the salt spray test to evaluate the creepage and blister conditions. The test was carried out using another resin type paint, i.e. an epoxy rein type paint (Copon Mastic Primer available from Nippon Paint Co. Ltd.) as a cold setting resin and an electrodeposition paint (Power Top U-30 available from Nippon Paint Co. Ltd.). In case of a Copon Mastic Primer, curing was carried out at ambient temperature for 10 days in a thickness of 50 μm, of which result is shown in Example 26. In case of Power Top U-30, the paint was electrodeposited at 150 Volt for 3 minutes and then cured at 170° C. for 30 minutes in a thickness of 25 μm, of which result is shown in Example 27.

Creepage was determined by the creepage width resulting from a scribe cut to the substrate by a knife. A standard sample was made by adding strontium chromate in an amount of 20% by weight based on the solid content instead of the corrosion preventive pigment. Evaluation was made in comparison with the standard sample expressed in terms of "excellent", "good", "Normal", and "bad".

Blister was evaluated by using the coated panel in a salt spray testing machine (35° C., 500 hours) as follow;
Good—substantially no blisters
Normal—a small number of blisters
Bad—many blisters

TABLE 2

| Example | Amount of the corrosion preventive pigment | Amount of the other pigments | Amount of vehicle | Oxygen permeability (P) | Salt spray test Creepage | Blister |
|---|---|---|---|---|---|---|
| 21 | 0.1 | 19.9 | 80 | $5 \times 10^{-10}$ | Good | Good |
| 22 | 0.5 | 19.5 | 80 | $5 \times 10^{-10}$ | Good | Good |
| 23 | 5.0 | 15.0 | 80 | $5 \times 10^{-10}$ | Good | Good |
| 24 | 20 | 10.0 | 70 | $5 \times 10^{-10}$ | Good | Good |
| 25 | 50 | 0 | 50 | $3 \times 10^{-9}$ | Normal | Normal |
| 26 | 5.0 | 15.5 | 80 | $9 \times 10^{-10}$ | Good | Good |
| 27 | 2.0 | Not determined | Not determined | $2 \times 10^{-11}$ | Excellent | Good |
| Comparative Ex. 3 | 10 Strontium chromate | 10 | 80 | $5 \times 10^{-10}$ | Normal | Normal |

EXAMPLES 28 to 44

A test was done as generally described in Example 1, with the exception that the phosphorus compound (a), a vanadium compound (b) and the network modifier (c) as shown in Table 3 were employed. The results are shown in Table 3.

TABLE 3

| Example | Phosphorus compound (a) | Vanadium compound (b) | Network modifier (c) | Molar ratio $P_2O_5:V_2O_5:MO^*$ | Calcining temp. (°C.) | Calcining time (h) | Cooling rate (°C./min) | pH** | Weight loss of corrosion |
|---|---|---|---|---|---|---|---|---|---|
| 28 | Composit phosphate pigment[1] | Vanadium oxide (V) ($V_2O_5$) | MgO | 1:1:4 | 1400 | 2 | Slow | 6.2 | Good |

TABLE 3-continued

| Example | Phosphorus compound (a) | Vanadium compound (b) | Network modifier (c) | Molar ratio $P_2O_5:V_2O_5:MO$* | Calcining temp. (°C.) | Calcining time (h) | Cooling rate (°C./min) | pH** | Weight loss of corrosion |
|---|---|---|---|---|---|---|---|---|---|
| 29 | Composit phosphate pigment[1] | Vanadium oxide (V) ($V_2O_5$) | MgO | 0.5:1:3 | 1400 | 2 | Slow | 6.8 | Normal |
| 30 | $Ca(H_2PO_4)_2$ | Vanadium oxide (V) ($V_2O_5$) | $3CaO.B_2O_3$ melt | 2:1:6 | 1100 | 1 | 300 | 7.8 | Good |
| 31 | $MgHPO_4$ | Vanadium oxide (V) ($V_2O_5$) | CaO | 2.5:1:7 | 1100 | 1 | 300 | 6.5 | Good |
| 32 | $Mg_3(PO_4)_2$ | Vanadium oxide (V) ($V_2O_5$) | CaO | 3:1:10 | 1400 | 3 | 600 | 7.1 | Good |
| 33 | Sludge in zincphosphating | Vanadium (V) ($V_2O_5$) | A mixture of CaO and MgO (1:1 mol) | 1:1:4 | 1400 | 3 | 600 | 7.1 | Normal |
| 34 | Aluminum tripoly phosphate type pigment[2] | Vanadium oxide (V) ($V_2O_5$) | MgO | 5:1:15 | 1100 | 2 | Slow | 6.3 | Normal |
| 35 | Orthophosphoric acid | Vanadium oxide (V) ($V_2O_5$) | MnO | 10:1:22 | 1000 | 2 | 300 | 7.8 | Good |
| 36 | Metaphosphoric acid | Vanadium oxide (V) ($V_2O_5$) | ZnO and MgO (molar ratio 3:6) | 2:1:9 | 1400 | 2 | 300 | 8.1 | Good |
| 37 | $P_2O_5$ | Vanadium oxide (III) ($V_2O_3$) | CaO | 1:1:2 | 1100 | 2 | Slow | 6.3 | Good |
| 38 | $P_2O_5$ | A mixture of $V_2O_5$ and $V_2O_3$ (mol ratio 1:1) | CaO | 1:1:4 | 650 | 1 | 300 | 6.6 | Good |
| 39 | $P_2O_5$ | $2MgO.V_2O_5$ melt | $CaSiO_3$ | 2:1:9 | 1400 | 2 | Slow | 8.1 | Normal |
| 40 | A mixture of $P_2O_5$ and metaphosphoric acid | $MnO.V_2O_5$ melt | $CaCO_3$ | 2:1:6 | 1100 | 2 | 500 | 7.5 | Good |
| 41 | $P_2O_5$ | $ZnO.V_2O_5$ melt | $PbCO_3$ | 2:1:6 | 1400 | 2 | 500 | 5.2 | Good |
| 42 | $P_2O_5$ | $CoO.V_2O_5$ melt | $Ca(OH)_2$ | 2:1:6 | 1100 | 2 | 500 | 7.5 | Good |
| 43 | $P_2O_5$ | $V_2O_5$ | NaOH | 1:1:4 | 800 | 2 | 100 | 6.4 | Good |
| 44 | Metaphosphoric acid | $V_2O_5.V_2O_4$ | $Na_2O$ | 1:1:4 | 1000 | 2 | 100 | 6.5 | Good |

[1]Available from Mizusawa Chemical Industries Co. Ltd as MIZUKANEX 300.
[2]Available from Teikoku Kako Co., Ltd. as K-White 82.
*MO or $M_2O$
**One gram of particles was dispersed in 100 ml of water and left at 25° C. for 48 hours. After that, pH was determined.
***Slow means a cooling late of less than 50° C./min.
Example 34 had light color.

EXAMPLE 45 to 51 and COMPARATIVE EXAMPLE 4

An amount of the pigment of Example 31 was changed and subjected to a salt spray test, as generally described in Examples 22 to 27 and Comparative Example 3. The results are shown in Table 4.

EXAMPLES 52 to 63 and COMPARATIVE EXAMPLES 5 and 6

A blister test was done as generally described in Example 1, with the exception that the phosphorus compound (a), a vanadium compound (b) and the network modifier (c) as shown in Table 5 were employed. The results are shown in Table 5.

TABLE 4

| Example | Amount of the corrosion preventive pigment | Amount of the other pigments | Amount of vehicle (P) | Oxygen permeability | Salt spray test Creepage | Salt spray test Blister |
|---|---|---|---|---|---|---|
| 45 | 0.1 | 19.9 | 80 | $5 \times 10^{-10}$ | Good | Good |
| 46 | 0.5 | 19.5 | 80 | $5 \times 10^{-10}$ | Good | Good |
| 47 | 5.0 | 15.0 | 80 | $5 \times 10^{-10}$ | Excellent | Good |
| 48 | 20 | 10.0 | 70 | $5 \times 10^{-10}$ | Excellent | Good |
| 49 | 50 | 0 | 50 | $7 \times 10^{-9}$ | Good | Normal |
| 50 | 5.0 | 15.0 | 80 | $1 \times 10^{-9}$ | Good | Good |
| 51 | 2.0 | Not determined | Not determined | $3 \times 10^{-11}$ | Excellent | Good |
| Comparative Ex. 4 | 10 Strontium chromate | 10 | 80 | $5 \times 10^{-10}$ | Normal | Normal |

TABLE 5

| Example | Phosphorus compound (a) | Vanadium compound (b) | Network modifier (c) | Molar ratio $P_2O_5:V_2O_5:MO$* | Calcining temperature (°C.) | Calcining time (hour) | Cooling rate (°C./min) | pH | Blister temperature gradience | Creepage under electric anticorrosion |
|---|---|---|---|---|---|---|---|---|---|---|
| 52 | $P_2O_5$ | $V_2O_5$ | $CaSiO_3$ | 1:0.5:4 | 1400 | 3 | 100 | 2.8 | Good | Normal |
| 53 | $P_2O_5$ | $V_2O_5$ | MgO | 1:0.1:1 | 1200 | 1 | 100 | 4.4 | Good | Good |

TABLE 5-continued

| | Phosphorus compound (a) | Vanadium compound (b) | Network modifier (c) | Molar ratio $P_2O_5:V_2O_5:MO*$ | Calcining temperature (°C.) | Calcining time (hour) | Cooling rate (°C./min) | pH | Blister temperature gradience | Creepage under electric anticorrosion |
|---|---|---|---|---|---|---|---|---|---|---|
| 54 | $P_2O_5$ | $V_2O_5$ | $Ca(OH)_2$ | 1:0.2:1 | 1200 | 1 | 100 | 4.0 | Good | Good |
| 55 | $P_2O_5$ | $V_2O_5$ | $CaCO_3$ | 1:1:1 | 1200 | 1 | 100 | 2.9 | Good | Good |
| 56 | $P_2O_5$ | $V_2O_5$ | ZnO | 1:0.2:1 | 1200 | 1 | 300 | 3.6 | Good | Excellent |
| 57 | $P_2O_5$ | $V_2O_5$ | $MnCO_3$ | 1:0.2:1 | 1200 | 1 | 300 | 3.9 | Good | Good |
| 58 | 85% phosphoric acid | $V_2O_5$ | $BaCO_3$ | 1:0.2:1 | 1000 | 1 | 300 | 4.2 | Good | Good |
| 59 | Metaphosphoric acid | $V_2O_5:V_2O_4$ (molar ratio 1:1) | $Zn(OH)_2$ | 1:1:1 | 1000 | 1 | 300 | 3.0 | Good | Good |
| 60 | Metaphosphoric acid | $V_2O_5$ | $Co(OH)_2$ | 1:0.1:1 | 1000 | 1 | 300 | 4.5 | Good | Good |
| 61 | Metaphosphoric acid | $V_2O_5$ | $Fe_2O_3$ | 1:0.5:1 | 1400 | 1 | Slow | 3.2 | Good | Good |
| 62 | Metaphosphoric acid | $V_2O_5:V_2O_3$ (molar ratio 1:1) | CaO | 1:1:1 | 800 | 2 | 100 | 2.8 | Good | Good |
| 63 | $P_2O_5$ | $V_2O_5$ | $Ca(OH)_2$ | 1:0.01:1 | 800 | 2 | Slow | 2.1 | Good | Normal |
| Comparative Ex. | | | | | | | | | | |
| 5 | | | | body pigment | | | | 6.5 | Normal | Normal |
| 6 | | | | Strontium chromate | | | | 8.0 | Bad | Good |

*MO or $M_2O$
**Slow means a cooling rate of less than 50° C./min.

EXAMPLES 64 TO 73

A test and preparation of the pigments were done as generally described in Example 1, with the exception that the phosphorus compound (a), a vanadium compound (b), the network modifier (c) and the glassy material (d) as shown in Table 6 were employed. The results are shown in Table 6.

TABLE 6

| Example | Phosphorus compound (a) | Vanadium compound (b) | Network modifier (c) | Molar ratio $P_2O_5:V_2O_5:M_2O$ | Glassy material (d) | Weight ratio (Times) | pH | Weight loss of corrosion |
|---|---|---|---|---|---|---|---|---|
| 64 | $Na_3PO_4$ | $V_2O_5$ | NaOH | 1:1:3 | Pyrex | 100 | 8.0 | Good |
| 65 | $Na_3PO_4$ | $V_2O_5$ | NaOH | 1:1:4 | Pyrex | 200 | 9.0 | Normal |
| 66 | $Na_3PO_4$ | $V_2O_5$ | NaOH | 1:1:1 | Pyrex | 50 | 5.2 | Good |
| 67 | 85% phosphoric acid | $V_2O_5$ | KOH | 1:1:3 | Pyrex | 10 | 4.0 | Normal |
| 68 | 85% phosphoric acid | $V_2O_5$ | — | 1:1:0 | Pyrex | 100 | 7.2 | Good |
| 69 | 85% phosphoric acid | $NaVO_3$ | $Na_2CO_3$ | 1:1:2 | Pyrex | 20 | 6.5 | Good |
| 70 | Metaphosphoric acid | $V_2O_5$ | LiOH | 2:1:4.5 | Pyrex | 50 | 6.8 | Good |
| 71 | Metaphosphoric acid | $V_2O_5$ | LiOH | 2:1:4.5 | C glass | 50 | 7.5 | Good |
| 72 | Metaphosphoric acid | $V_2O_5$ | LiOH | 2:1:4.5 | E glass | 50 | 7.8 | Good |
| 73 | Metaphosphoric acid | $V_2O_5$ | LiOH | 2:1:4.5 | Pyrex | 10 | 7.5 | Good |

Examples 64, 65, 68, 69, 70, 71, and 72 had light color.
Calcining temperature is 1200° C. for all samples.

EXAMPLE 74 TO 80 AND COMPARATIVE EXAMPLE 4

An amount of the pigment of Example 73 was changed and subjected to a salt spray test, as generally described in Examples 21 to 27 and Comparative Example 3. The results are shown in Table 7.

TABLE 7

| | Amount of the corrosion preventive pigment | Amount of the other pigments | Amount of vehicle | Oxygen permeability (P) | Salt spray test | |
|---|---|---|---|---|---|---|
| | | | | | Creepage | Blister |
| Example | | | | | | |
| 74 | 0.1 | 19.9 | 80 | $5 \times 10^{-10}$ | Good | Good |
| 75 | 0.5 | 19.5 | 80 | $5 \times 10^{-10}$ | Good | Good |
| 76 | 5.0 | 15.0 | 80 | $5 \times 10^{-10}$ | Excellent | Good |
| 77 | 20 | 10.0 | 70 | $5 \times 10^{-10}$ | Excellent | Good |
| 78 | 50 | 0 | 50 | $7 \times 10^{-9}$ | Normal | Normal |
| 79 | 5.0 | 15.0 | 80 | $7 \times 10^{-10}$ | Good | Good |
| 80 | 2.0 | Not determined | Not determined | $1 \times 10^{-11}$ | Good | Good |
| Comparative Ex. 7 | 10 Strontium chromate | 10 | 80 | $5 \times 10^{-10}$ | Normal | Normal |

EXAMPLE 52 TO 63 AND COMPARATIVE EXAMPLES 8 AND 9

A blister test was done as generally described in Example 1, with the exception that the phosphorus compound (a), a vanadium compound (b), the network modifier (c) and the glassy material as shown in Table 8 were employed. The results are shown in Table 8.

TABLE 8

| | Phosphorus compound (a) | Vanadium compound (b) | Network modifier | Molar ratio $P_2O_5:V_2O_5:MO*$ | Glassy Material Wt. ratio (times) | Calcining temperature | Calcining time (hour) | pH | Blister temperature gradience | Creepage under electric anticorrosion |
|---|---|---|---|---|---|---|---|---|---|---|
| Example | | | | | | | | | | |
| 81 | 85% phosphoric acid. Metaphosphoric acid | $V_2O_5$ (0.4 mole) $V_2O_3$ (0.1 mole) | CaO | 1:0.5:4 (20) | E glass | 13001 | 2 | 3.7 | Good | Excellent |
| 82 | 85% phosphoric acid. Metaphosphoric acid | Sadium metavanadate | $Na_2CO_3$ | 1:1:1 (10) | E glass | 1200 | 2 | 4.5 | Good | Good |
| 83 | $P_2O_5$ | $V_2O_5$ | LiOH | 1:0.1:0.1 (50) | C glass | 1000 | 2 | 6.2 | Good | Good |
| 84 | Metaphosphoric acid | $V_2O_5$ | — | 1:1:0 (30) | Pyrex | 1200 | 3 | 4.2 | Good | Good |
| Comparative Ex. | | | | | | | | | | |
| 8 | — | | | Extender | | | | 6.5 | Normal | Normal |
| 9 | | | | Strontium chromate | | | | 8.0 | Bad | Good |

Examples 81–84 had light color.

EXAMPLE 85 TO 115

In the present example, the corrosion weight loss of a mixture of the phosphorus compound and the vanadium compound was compared with that of the chromate ions. The results are shown in Table 9 and Table 10. The corrosion weight loss was tested as follow: A steel test panel of 70×150 mm having a gram was immersed in an aqueous dispersion containing 10 g/l of the corrosion preventive pigment of the present invention or a chromate pigment for 20 days and dried. The weight of the panel (b gram) was then measured and the weight loss was calculated from an equation:

$$Weight\ loss = (a - b)/210 (g/cm^2)$$

Weight loss of the panel was determined and compared with the strontium chromate of the same amount. In the evaluation, "good" shows superior corrosion resistance to that of strontium chromate, "Normal" means equal to it and "bad" means it is inferior to it.

The pH value is determined by measuring the pH of the aqueous dispersion of 10 g/l of the pigments, the phosphorous compounds or the vanadium compounds. The dispersion is maintained at 25° C. for 2 days. The electric conductivity ($\kappa$) is determined by using a conduct-meter under the same conditions.

TABLE 9

| Example numbers | Phosphorus compound (a) species | pH | $\kappa$ $\mu$ S/cm | Vanadium compound (b) Species | pH | $\kappa$ $\mu$ S/cm | $P_2O_5/V_2O_5$ wt. ratio | Evaluation | pH of the mixture of (a) and (b) |
|---|---|---|---|---|---|---|---|---|---|
| 85 | Calcium hydrogenphosphate | 7.1 | 163 | $Mn_3O_4.V_2O_5^a$ | 7.1 | 63 | 1/1 | Good | 7.1 |
| 86 | Tricalcium phosphate | 7.3 | 33 | $Mn_3O_4.V_2O_5^a$ | 7.1 | 63 | 3/1 | Normal | 7.3 |
| 87 | Magnesium ($Mg_3(PO_4)_2$) phosphate | 8.3 | 200 | $Mn_3O_4.V_2O_5^a$ | 7.1 | 63 | 1/1 | Good | 7.8 |
| 88 | Barium hydrogenphosphate | 7.5 | 69 | $Mn_3O_4.V_2O_5^a$ | 7.1 | 63 | 2/1 | Normal | 7.4 |
| 89 | Magnesium hydrogenphosphate (trihydrous) | 7.2 | 400 | $Mn_3O_4.V_2O_5^a$ | 7.1 | 63 | 1/1 | Good | 7.2 |
| 90 | Calcium bis(hydrogenphosphate) | 3.4 | 4400 | $3MnO_2.V_2O_5^b$ | 7.7 | 30 | 1/1 | Good | 5.7 |
| 91 | Calcium hydrogenphosphate | 7.1 | 150 | $MnO_2.V_2O_5^b$ | 5.0 | 150 | 1/1 | Good | 6.0 |
| 92 | Tricalcium phosphate | 7.4 | 30 | $MnO_2.V_2O_5^b$ | 5.0 | 150 | 1/1 | Normal | 6.1 |
| 93 | Magnesium hydrogenphosphate (anhydrous) | 7.5 | 520 | $MnO_2.V_2O_5^b$ | 5.0 | 150 | 1/1 | Good | 6.3 |
| 94 | Trimagnesium phosphate | 9.0 | 90 | $MnO_2.V_2O_5^b$ | 5.0 | 150 | 1/1 | Good | 7.5 |
| 95 | Calcium hydrogenphosphate | 7.1 | 150 | $2MnO_2.V_2O_5^b$ | 6.6 | 90 | 2/1 | Good | 7.0 |
| 96 | Magnesium hydrogenphosphate (anhydrous) | 7.5 | 520 | $2MnO_2.V_2O_5^b$ | 6.6 | 90 | 3/1 | Good | 7.2 |
| 97 | Tricalcium phosphate | 7.4 | 30 | $MnO_2.10V_2O_5^b$ | 4.5 | 300 | 5/1 | Good | 7.4 |
| 98 | Magnesium hydrogenphosphate (anhydrous) | 7.5 | 520 | $10MnO_2.V_2O_5^b$ | 8.1 | 30 | 1/2 | Normal | 7.9 |
| 99 | Calcium hydrogenphosphate | 7.1 | 150 | $3MnO_2.V_2O_5^b$ | 7.7 | 30 | 1/1 | Good | 7.2 |
| 100 | Aluminum tripolyphosphate | 6.6 | 30 | $3MnO_2.V_2O_5^b$ | 7.7 | 30 | 2/1 | Good | 6.8 |
| 101 | Aluminum phospho molybdate | 6.9 | 30 | $3MnO_2.V_2O_5^b$ | 7.7 | 30 | 2/1 | Good | 7.0 |
| 102 | Magnesium hydrogenphosphate (trihydrous) | 7.2 | 400 | Calcium pyrovanadate | 8.5 | 230 | 1/1 | Good | 8.0 |
| 103 | Sludge of zinc phosphate treatment | 6.5 | 190 | Calcium pyrovanadate | 8.5 | 230 | 1/1 | Normal | 7.9 |
| 104 | Zinc tripolyphosphate | 7.5 | 410 | $3ZnO.V_2O_5$ | 5.8 | 370 | 1/1 | Good | 6.8 |
| 105 | Magnesium hydrogenphosphate (trihydrous) | 7.2 | 400 | $3ZnO.V_2O_5$ | 5.8 | 370 | 2/1 | Good | 6.8 |
| 106 | Calcium metaphosphate | 8.1 | 40 | $3Ca(OH)_2.V_2O_5$ | 7.8 | 58 | 2/1 | Good | 8.1 |
| 107 | Aluminum tripolyphosphate | 6.6 | 26 | $3Ca(OH)_2.V_2O_5$ | 7.8 | 58 | 5/1 | Good | 6.7 |
| 108 | Aluminum phosphorus | 6.9 | 29 | $3Ca(OH)_2.V_2O_5$ | 7.8 | 58 | 10/1 | Good | 7.3 |

TABLE 9-continued

| Example numbers | Phosphorus compound (a) species | pH | κ μ S/cm | Vanadium compound (b) Species | pH | κ μ S/cm | $P_2O_5$/ $V_2O_5$ wt. ratio | Evaluation | pH of the mixture of (a) and (b) |
|---|---|---|---|---|---|---|---|---|---|
| | molybdate | | | | | | | | |
| 109 | Aluminum tripolyphosphate | 6.6 | 26 | $2Co(OH)_2 \cdot V_2O_5$ | 6.0 | 100 | 1/1 | Normal | 6.2 |
| 110 | Aluminum tripolyphosphate | 6.6 | 26 | $Ni_2O_3 \cdot V_2O_5$ | 5.8 | 73 | 5/1 | Good | 6.2 |
| 111 | Aluminum tripolyphosphate | 6.6 | 26 | $3MnO \cdot V_2O_5$ | 7.7 | 42 | 10/1 | Good | 6.7 |
| 112 | Aluminum tripolyphosphate | 6.6 | 26 | $Mn_2O_3 \cdot V_2O_5$ | 7.0 | 90 | 10/1 | Good | 6.7 |
| 113 | Magnesium hydrogen-phosphate (trihydrous) | 7.2 | 400 | $Co_3O_4 \cdot V_2O_5$ | 6.7 | 360 | 1/1 | Good | 7.2 |
| 114 | Magnesium hydrogenphosphate (trihydrous) | 7.2 | 400 | $5/3CaO \cdot V_2O_5$ | 7.7 | 950 | 1/1 | Good | 7.5 |
| 115 | Calcium hydrogenphosphate | 7.1 | 163 | $V_2O_5 \cdot Ca(OH)_2 \cdot Ca(H_2PO_4)_2 \cdot H_2O^c$ | 7.9 | 350 | 1/1 | Good | 7.8 |

$^a V_2O_5$ and $V_3O_4$ were uniformly mixed and baked at 1100° C. for 2 hours. The resultant melt was ground by a hummer mill to a particle size of less than 1mm and then further ground by a jet mill to 10 μm. The other vanadium compound were prepared as generally described above, unless otherwise indicated.
$^b$The manganese compound and the vanadium compound were uniformly mixed and baked for 2 hours at 1100° C. for Examples 90 to 94, 1200° C. for Examples 95 and 96, 900° C. for Example 97, 1400° C. for Example 98 and 1150° C. for Examples 99 to 101. The resultant melt was ground to less than 10 μm
$^c V_2O_5$, $Ca(H_2PO_4)$ and $Ca(OH)_2$ were mixed by an automatic mortar at a molar ratio of 0.7:0.5:1.4 for 5 hours. The resultant mixtue was dried at 100° C. for one hour and then ground by a mortar for one hour.

TABLE 10

| Example | Phosphorus compound (a) | Vanadium compound (b) | Network modifier (c) | Molar ratio $P_2O_5:V_2O_5:MO$ | Mixing method | pH | κ μ S/cm | Evaluation |
|---|---|---|---|---|---|---|---|---|
| 116 | $CaHPO_4$ | $V_2O_5$ | $Mg(OH)_2$ | 40:1:84 | A (10 h) | 7.8 | 600 | Good |
| 117 | $MgHPO_4$ | $V_2O_5$ | CaO | 5:1:13 | B (5 h) | 7.5 | 940 | Good |
| 118 | $Ca(H_2PO_4)$ | $V_2O_5$ | MgO | 10:1:22 | C (30 min.) | 6.2 | 700 | Good |
| 119 | $HPO_3$ | $CaO \cdot V_2O_5$ | MgO | 5:1:14 | A (5 h) | 7.8 | 1000 | Good |

A: Mixing and grinding by an automatic mortal and the drying at 200° C. for 2 hours.
B: Mixing and grinding by a hummer mill and then drying at 200° C. for 2 hours.
C: Mixing and grinding by a stone mill type grinder available from Masuko Sangyo Company as Masukoroider and then drying at 200° C. for 2 hours.

EXPERIMENT 1

(Comparison with Balducci)

Preparation of pigments

A mixture shown in the following Table 11 was mixed with a small amount of water to form a slurry mixture. The mixture was then heated at 700° or 800° C. for one hour and ground with a hummer mill and an automatic mortal to obtain a pigment. The pigment is evaluated for corrosion preventive properties.

TABLE 11

| | | | for Balducci | | | |
|---|---|---|---|---|---|---|
| Example No. for Balducci | Phosphorus compound (mmol) | Vanadium compound (mmol) | Network modifier (mmol) | PH[1] | Corrosion weight loss[2] | Corrosive salt spray test[3] |
| Ex. 5 | $BiPO_4$ 20 g (65.8) | $NH_4VO_3$, 2.76 g (23.6) | MgO, 0.95 g (23.5) | 7.2 | Bad | Normal |
| Ex. 10 | | 5.51 g (47.2) | 1.90 g (47.2) | 7.1 | Bad | No test |
| Ex. 18 | | 4.59 g (39.3) | 2.28 g (51.1) | 8.6 | Bad | Bad |
| Ex. 16 | | 3.67 g (31.4) | 2.66 g (66.0) | 9.9 | Bad | No test |
| Ex. 13 | | 2.76 g (23.6) | 2.57 g (63.6) | 9.8 | Bad | No test |
| Ex. 6 700° C. | $BiPO_4$ (50) | $V_2O_5$ (10) | CaO (50) | 10.9 | Bad | No test |
| Ex. 7 680° C. | $BiPO_4$ (100) | $V_2O_5$ (10) | MgO (40) | 3.3 | Bad | No test |
| | | | for the present invention | | | |
| Ex. No. | Phosphorus compound (mmol) | Vanadium compound (mmol) | Network modifier (mmol) | PH | Corrosion weight loss | Corrosive salt spray test |
| 1-c | $CaHPO_4$ | $V_2O_5/2MnO_2$ (*) | — | 7.1 | Good | Good |
| 1-b | $MgHPO_4 3H_2O$ | $V_2O_5/3ZnO$ (*) | — | 6.8 | Good | Excellent |
| 1-h | $MgHPO_4 3H_2O$ | $V_2O_5$ | MgO | 6.8 | Good | Good |

(*) They were calcined at 1000° C. for 3 hours, then powdered by stamp mill and mortal.
[1] The pH of the powdered pigments were measured by pH-meter in the dispersion of one gram of the pigment in 100 ml of water.
[2] The powdered pigment were dispersed in a 3% NaCl solution to form a 10 g/l dispersion in which a polished steel panel (JIS 3141 G SPCC(SB)) was immersed for 10 days. The weight loss of the panel was determined and compared with strontium chromate of the same amount. In the evaluation, "good" shows superior to strontium chromate, "normal" shows equal to it and "bas" shows inferior to it.
[3] The corrosion preventive pigments were formulated to a following polyester paint.

| Paint formulation | Parts by weight |
| --- | --- |
| A polyester resin[1] | 33.3 |
| A melamine resin[2] | 9.3 |
| An epoxy resin[3] | 2.6 |
| $TiO_2$ | 20.8 |
| The corrosion preventive pigment | 5.2 |
| Isopropyl alcohol | 2.6 |
| Cellosolve acetate | 26.0 |
| A leveling agent[4] | 0.2 |

[1]Available from Nippon Paint Co., Ltd. as R 4304.
[2]Available from Nippon Paint Co., Ltd. as MF 009.
[3]Available from Nippon Paint Co., Ltd. as EP 0150.
[4]Available from Nippon Paint Co., Ltd. as Leveler S.

The obtained paint was coated on a steel panel (JIS 3141 G SPCC(SD)) and cured at 140° C. for 20 minutes. The cured film has a thickness of 30 micrometers. The panel was subjected to a salt spray test according to JIS Z 2371. The creepage was evaluated by scribing the coated surface and taking off an adhesive tape which has been attached to the scribed portion. The evaluation was expressed by the ratio of the creepage length of the paint containing the corrosion preventive pigment and a blank paint without such pigment.

| Bad | 1.2 ≦ ratio |
| --- | --- |
| Normal | 0.7 ≦ ratio < 1.2 |
| Good | 0.2 ≦ ratio < 0.7 |
| Excellent | ratio < 0.2 |

CONCLUSION

As is apparent from the above Experiment 1, the pigment of Balducci is very poor in respect to the corrosion preventive properties general. We do not know why Balducci has this defect. We believe that, if $BiPO_4$ is employed, the pigment has difficulty generating phosphate ions.

On the other hand, the pigment of the present invention has excellent corrossion preventive properties in comparison with Balducci.

EXPERIMENT 2

(Comparison with Hund)

Pigments were prepared according to Examples 7 to 12 of W Germany 1417963 (Hund) reference.

Pigment A

This pigment was prepared from Example 7 of the Hund reference: 1.646 g $B_2O_3$ (from $H_3BO_3$)+3.354 g $P_2O_5$ (from $(NH_4)_3PO_4$)+0.100 g $Li_2O$ (from $Li_2CO_3$)+1.826 g $V_2O_5$ (from $NH_4CO_3$) were mixed and heated at 400° to 500° C. for 15 minutes. It was then ground and heated again at 700° C. and 750° C. for ½ hours. A yellow green pigment having an alphacristobalite structure was obtained.

Pigment B

This pigment was prepared form Example 8 of the Hund reference: 1.646 g $B_2O_3$ (from $H_3BO_3$)+3.354 g $P_2O_5$ (from $(NH_4)_3PO_4$)+0.500 g ZnO (from $ZnCO_3$)+1.118 g $V_2O_5$ (from $NH_4CO_3$) were mixed and heated at about 500° C. for 15 minutes. It was then ground and heated again at 700° C. for ½ hours. A yellow green pigment having an alphacristobalite structure was obtained.

Pigment C

This pigment was prepared from Example 9 of the Hund reference: 1.646 g $B_2O_3$ (from $H_3BO_3$)+3.354 g $P_2O_5$ (from $(NH_4)_3PO_4$)+0.500 g MnO (from $MnCO_3$)+1.282 g $V_2O_5$ (from $NH_4CO_3$) were mixed and heated at 400° to 500° C. for 15 minutes. It was then ground and heated again at 700° C. for hours in $N_2$ atmosphere. A gray pigment having an alphacristobalite structure was obtained.

Example D

This pigment was prepared from Example 10 of the Hund reference: 1.646 g $B_2O_3$ (from $H_3BO_3$)+3,354 g $P_2O_5$ (from $(NH_4)_3PO_4$)+0.500 g CoO (from $CoCO_3$)+1.215 g $V_2O_5$ (from $NH_4CO_3$) were mixed and heated at about 500° C. for 15 minutes. It was then ground and heated again at 700° C. and 900° C. for ½ hours. A braun olive pigment having an alpha-cristobalite structure was obtained.

Example E

This pigment was prepared from Example 11 of the Hund reference: 1.646 g $B_2O_3$ (from $H_3BO_3$)+3,354 g $P_2O_5$ (from $(NH_4)_3PO_4$)+0.500 g $B_2O_3$ (from $H_3BO_3$)+1.303 g $V_2O_5$ (from $NH_4CO_3$) were mixed and heated at 400° to 500° C. for 15 minutes. It was then ground and heated again at 600° C., 800° C. and 1000° C. for ½ hours. A brown orange pigment having an alpha-cristobalite structure was obtained.

Example F

This pigment was prepared from Example 12 of the Hund reference: 1.646 g $B_2O_3$ (from $H_3BO_3$)+3.354, g $P_2O_5$ (from $(NH_4)_3PO_4$)+0.500 g $Al_2O_3$ (from $Al(OH)_3$)+0.892 g $V_2O_5$ (from $NH_4CO_3$) were mixed and heated at about 500° C. for 15 minutes. It was then ground and heated again at 700° C. for ½ hours. An orange pigment having an alpha-cristobalite structure was obtained.

Each one gram of the above pigments was suspended in 100 ml of water and a pH of the suspension was determined. The result are shown in the following Table 12.

TABLE 12

| Example Nos. of Hund | pH |
| --- | --- |
| 7 | 2.2 |
| 8 | 2.4 |
| 9 | 2.1 |
| 10 | 2.15 |
| 11 | 2.0 |
| 12 | 2.2 |

We utilized Example 8 of Hund for the following data, because the pigment of Example 8 has the nearest pH to a pH of 5.

The pigment of the Example 8 was formulated into an epoxy resin paint (Copon Mastic Primer available from Nippon Paint Co. Ltd.) in an amount of 0.1 parts by weight based on 100 parts by weight of the paint. The obtained paint was applied to a steel panel and cured at 180° C. for 30 minutes. The obtained panel was subjected to a salt spray test according to JIS Z 2371 and the corrosion preventive properties, such as creepage from the cut portion and blisters on the surface, were evaluated. The panel was also subjected to a blister test under a temperature gradience wherein the temperature gradience was set to 40° C. on the coated side and to 20° C. on the other side and the coated panel wa immersed in water for 14 days after which blisters on the coating were visually evaluated. Evaluations were done as described in the specification of the present invention, using the terms, excellent, good, normal and bad to describe the properties. The results of this experiment were normal in respect to blisters under a temperature gradience, bad in creepage from a cut portion and bad in respect to blisters on the surface.

What is claimed is:

1. A corrosion preventive pigment consisting essentially of
   (a) a phosphorus compound which generates phosphate ions in the presence of water and oxygen and has a conductivity of 100 microS/cm to 3 mS/cm, selected from the group consisting of a phosphorous pentoxide, an orthophosphoric acid, a condensed phosphoric acid, an alkaline earth metal or transition metal phosphate, or an alkaline earth metal or transition metal condensed phosphate, and
   (b) a vandium compound which generates a vanadate ion in the presence of water and oxygen and has a conductivity of 100 microS/cm to 3 mS/cm, selected from the group consisting of vanadium (V) oxide, a vanadyl compound, an alkaline earth metal or transition metal vanadate, a baked condensate of alkaline earth metal or transition metal vanadates, or a heterocondensate of alkaline earth metal or a transition metal vanadates in a $P_2O_5/V_2O_5$ molar ratio of 0.3 to 100;
   and which has a pH value of from 5 to 9.

2. The pigment according to claim 1 being prepared by mixing the phosphorus compound and the vanadium compound followed by grinding.

3. The pigment according to claim 2 being prepared by intimately mixing the phosphorus compound (a) and the vanadium compound (b) to form a powdered mixture having a particle size of not more than 10 micrometers.

4. A corrosion preventive pigment consisting essentially of
   (a) a phosphorus compound which generates phosphate ions in the presence of water and oxygen and has a conductivity of 100 microS/cm to 3 mS/cm, selected from the group consisting of a phosphorus pentoxide, an orthophosphoric acid, a condensed phosphoric acid, an alkaline earth metal or transition metal phosphate, and an alkaline earth metal or transition metal condensed phosphate,
   (b) a vanadium compound which generates a vanadate ion in the presence of water and oxygen and has a conductivity of 30 microS/cm to 3 mS/cm, selected from the group consisting of vanadium (V) oxide, a vanadyl compound, an alkaline earth metal or transition metal vanadate, a baked condensate of alkaline earth metal or transition metal vanadates, and a heterocondensate of alkaline earth metal or transition metal vanadates, and
   (c) a network modifier;
   said components (a) and (b) being present in a $P_2O_5/V_2O_5$ molar ratio of 0.3 to 100, and said component (c) being present in an amount of 1.3 times to 3.0 times the total molar number of $V_2O_5$ and $P_2O_5$ in the case where all of the metal atoms in the obtained pigment are expressed in the form of MO, $M_2O_3$, $M_3O_4$, $MO_2$ according to their oxidation numbers.

5. The pigment according to claim 4 wherein said network modifier is selected from the group consisting of metal oxides, metal hydroxides, metal carbonates or mixtures thereof in which the metal is selected from the group consisting of alkaline earth metals and transition metals.

6. The pigment according to claim 5 wherein the network modifier is manganese oxide or a combination of manganese oxide with other network modifiers selected from the group consisting of metal oxides, metal hydroxides, metal carbonates and mixtures thereof.

* * * * *